United States Patent [19]
Estelle

[11] Patent Number: 4,934,795
[45] Date of Patent: Jun. 19, 1990

[54] ZOOM LENS

[75] Inventor: Lee R. Estelle, Rochester, N.Y.

[73] Assignee: Eastman Kodak Company, Rochester, N.Y.

[21] Appl. No.: 283,115

[22] Filed: Dec. 12, 1988

Related U.S. Application Data

[63] Continuation-in-part of Ser. No. 131,976, Dec. 11, 1987, abandoned.

[51] Int. Cl.⁵ .................. G02B 15/16; G02B 13/18
[52] U.S. Cl. ................................. 350/427; 350/432
[58] Field of Search .............. 350/423, 427, 432–435

[56] References Cited

U.S. PATENT DOCUMENTS

| | | | |
|---|---|---|---|
| 3,524,696 | 8/1970 | Higuchi | 350/427 |
| 4,094,586 | 6/1978 | Sato et al. | 350/427 |
| 4,105,291 | 8/1978 | Tsuji | 350/427 |
| 4,113,355 | 9/1978 | Tsuji et al. | 350/427 |
| 4,368,954 | 1/1983 | Tsuji | 350/427 |
| 4,380,377 | 4/1983 | Sato et al. | 350/427 |
| 4,456,341 | 6/1984 | Kato | 350/427 |
| 4,525,036 | 6/1985 | Fujibayashi et al. | 350/427 |
| 4,618,220 | 10/1986 | Kato | 350/427 |
| 4,629,292 | 12/1986 | Fujioka | 350/427 |
| 4,659,187 | 4/1987 | Tsuji et al. | 350/423 |
| 4,659,189 | 4/1987 | Kitagishi | 350/427 |
| 4,740,063 | 4/1988 | Itoh et al. | 350/427 |
| 4,749,267 | 6/1988 | Mihara | 350/427 |
| 4,802,747 | 2/1989 | Horiuchi | 350/427 |

Primary Examiner—Scott J. Sugarman
Attorney, Agent, or Firm—Armin B. Pagel

[57] ABSTRACT

Zoom lenses having a positive unit facing the long conjugate and consisting of a cemented doublet and a single element therebehind; a negative unit movable for zooming and consisting of a negative element and a negative doublet concave toward each other; a second positive unit movable for zooming and consisting of a single component including at least one positive element; and a stationary rear unit consisting of a triplet or triplet derivative wherein any element additional to three is a positive element. The zoom lens has a zoom range greater than 5×, a total coverage exceeding 48° at some zoom position and an f-number faster than f-1.2 when the number of elements in the lens is 12 or less and faster than f-1.6 when the number of elements is 10 or less.

25 Claims, 19 Drawing Sheets

| SURFACE | CLEAR APERTURE | RADIUS | THICKNESS | REFRACTIVE INDEX | Abbé V NUMBER |
|---|---|---|---|---|---|
| S1 | 38.90 | 60.9222 | 1.400 | 1.805 | 25.4 |
| S2 | 36.52 | 28.4710 | 9.831 | 1.516 | 64.1 |
| S3 | 35.88 | -160.333 | 0.100 | | |
| S4 | 32.39 | 29.2124 | 6.186 | 1.691 | 54.8 |
| S5 | 30.80 | 217.953 | VAS 1 | | |
| S6 | 13.14 | -83.2997 | 0.900 | 1.834 | 37.3 |
| S7 | 11.20 | 11.3437 | 2.697 | | |
| S8 | 11.16 | -20.9476 | 0.900 | 1.691 | 54.8 |
| S9 | 11.93 | 10.1285 | 3.032 | 1.847 | 23.8 |
| S10 | 12.10 | 84.2060 | VAS 2 | | |
| S11 | 18.35 | 44.8396 | 6.309 | 1.657 | 36.7 |
| S12 | 18.47 | -13.6530 | 0.900 | 1.847 | 23.8 |
| S13 | 19.20 | -32.5751 | VAS 3 | | |
| | 19.32 | DIAPHRAGM | 2.800 | | |
| S14 | 19.56 | 14.9052 | 6.300 | 1.697 | 55.5 |
| S15 | 18.16 | -151.528 | 5.099 | | |
| S16 | 13.80 | ASPHERE | 0.950 | 1.785 | 26.1 |
| S17 | 13.68 | 13.4237 | 1.880 | | |
| S18 | 14.10 | 77.5372 | 3.000 | 1.691 | 54.8 |
| S19 | 14.85 | -20.4114 | 0.110 | | |
| S20 | 16.36 | 19.0474 | 4.500 | 1.603 | 60.7 |
| S21 | 16.22 | -26.2507 | 5.000 | | |
| S22 | 12.43 | PLANO | 7.500 | 1.516 | 64.1 |
| S23 | 9.53 | PLANO | | | |

TABLE 1

FIG. 2

| EFFECTIVE FOCAL LENGTH | BACK FOCAL LENGTH | LENS LENGTH | LENGTH OF | | |
|---|---|---|---|---|---|
| | | | VAS 1 | VAS 2 | VAS 3 |
| 9.22 | 12.45 | 85.399 | 1.495 | 17.936 | 9.074 |
| 22.22 | 12.42 | 85.398 | 13.961 | 13.544 | 1.000 |
| 53.49 | 12.36 | 85.399 | 19.278 | 2.495 | 6.732 |

TABLE 2

FIG. 3

| SURFACE | CLEAR APERTURE | RADIUS | THICKNESS | REFRACTIVE INDEX | Abbé V NUMBER |
|---|---|---|---|---|---|
| S201 | 34.00 | 67.2816 | 0.900 | 1.805 | 25.4 |
| S202 | 32.56 | 28.2623 | 8.060 | 1.516 | 64.1 |
| S203 | 32.23 | -113.295 | 0.100 | | |
| S204 | 30.04 | 26.7943 | 5.162 | 1.691 | 54.8 |
| S205 | 29.27 | 159.848 | VAS 201 | | |
| S206 | 12.60 | -102.467 | 0.900 | 1.834 | 37.3 |
| S207 | 10.80 | 10.8209 | 3.011 | | |
| S208 | 10.93 | -18.4410 | 0.900 | 1.691 | 54.8 |
| S209 | 12.22 | 10.5695 | 3.332 | 1.847 | 23.8 |
| S210 | 12.49 | 148.756 | VAS 202 | | |
| S211 | 19.46 | 53.0900 | 6.326 | 1.657 | 36.7 |
| S212 | 19.64 | -14.4842 | 0.900 | 1.847 | 23.8 |
| S213 | 20.52 | -33.9193 | VAS 203 | | |
| | 20.74 | DIAPHRAGM | 2.800 | | |
| S214 | 21.29 | 16.4761 | 6.300 | 1.697 | 55.5 |
| S215 | 19.96 | -276.268 | 6.680 | | |
| S216 | 14.26 | ASPHERE | 0.950 | 1.785 | 26.1 |
| S217 | 14.53 | 15.5955 | 1.350 | | |
| S218 | 15.18 | 31.5979 | 4.500 | 1.691 | 54.8 |
| S219 | 15.98 | -19.2937 | 0.300 | | |
| S220 | 16.42 | 20.6948 | 3.800 | 1.603 | 60.7 |
| S221 | 16.03 | -63.4256 | 5.000 | | |
| S222 | 12.83 | PLANO | 7.500 | 1.516 | 64.1 |
| S223 | 10.03 | PLANO | | | |

TABLE 3

FIG. 5

| EFFECTIVE FOCAL LENGTH | BACK FOCAL LENGTH | LENS LENGTH | LENGTH OF | | |
|---|---|---|---|---|---|
| | | | VAS 201 | VAS 202 | VAS 203 |
| 9.22 | 13.20 | 85.399 | 1.495 | 17.936 | 9.074 |
| 22.22 | 13.16 | 85.398 | 13.961 | 13.544 | 1.000 |
| 53.49 | 13.09 | 85.399 | 19.278 | 2.495 | 1.732 |

TABLE 4

FIG. 6

| SURFACE | CLEAR APERTURE | RADIUS | THICKNESS | REFRACTIVE INDEX | Abbé V NUMBER |
|---|---|---|---|---|---|
| S301 | 34.40 | 88.1710 | 0.900 | 1.805 | 25.4 |
| S302 | 33.13 | 31.0710 | 8.103 | 1.516 | 64.1 |
| S303 | 32.89 | -81.8223 | 0.100 | | |
| S304 | 30.30 | 26.7278 | 4.921 | 1.691 | 54.8 |
| S305 | 29.57 | 123.327 | VAS 301 | | |
| S306 | 13.74 | -432.666 | 0.900 | 1.720 | 50.3 |
| S307 | 11.50 | 11.0422 | 3.529 | | |
| S308 | 11.49 | -15.8709 | 0.900 | 1.691 | 54.8 |
| S309 | 12.63 | 12.0957 | 2.792 | 1.847 | 23.8 |
| S310 | 12.83 | 96.1403 | VAS 302 | | |
| S311 | 19.34 | ASPHERE | 3.000 | 1.589 | 61.0 |
| S312 | 19.53 | -53.7465 | VAS 303 | | |
| | 19.64 | DIAPHRAGM | 2.800 | | |
| S313 | 20.43 | 15.9201 | 8.000 | 1.697 | 55.5 |
| S314 | 18.34 | -63.4890 | 2.950 | | |
| S315 | 15.69 | ASPHERE | 1.500 | 1.785 | 26.1 |
| S316 | 15.00 | 15.9256 | 1.916 | | |
| S317 | 15.62 | 56.9972 | 4.500 | 1.691 | 54.8 |
| S318 | 16.57 | -19.5166 | 1.000 | | |
| S319 | 17.10 | 24.5863 | 5.600 | 1.607 | 56.8 |
| S320 | 16.42 | -49.7539 | 5.000 | | |
| S321 | 13.24 | PLANO | 7.500 | 1.516 | 64.1 |
| S322 | 10.53 | PLANO | | | |

TABLE 5

FIG. 8

| EFFECTIVE FOCAL LENGTH | BACK FOCAL LENGTH | LENS LENGTH | LENGTH OF | | |
|---|---|---|---|---|---|
| | | | VAS 301 | VAS 302 | VAS 303 |
| 9.22 | 14.28 | 82.552 | 1.495 | 18.187 | 9.457 |
| 22.21 | 14.26 | 82.551 | 13.848 | 14.291 | 1.000 |
| 53.50 | 14.23 | 82.552 | 19.476 | 2.495 | 7.169 |

TABLE 6

FIG. 9

| SURFACE | CLEAR APERTURE | RADIUS | THICKNESS | REFRACTIVE INDEX | Abbé V NUMBER |
|---|---|---|---|---|---|
| S401 | 32.59 | 83.1671 | 0.900 | 1.805 | 25.4 |
| S402 | 31.18 | 29.1023 | 8.043 | 1.516 | 64.1 |
| S403 | 30.80 | −69.6248 | 0.100 | | |
| S404 | 27.50 | 23.3625 | 4.693 | 1.691 | 54.8 |
| S405 | 26.58 | 81.4355 | VAS 401 | | |
| S406 | 12.00 | 377.836 | 0.900 | 1.720 | 50.3 |
| S407 | 9.96 | 9.60466 | 3.011 | | |
| S408 | 9.75 | −12.8277 | 0.900 | 1.691 | 54.8 |
| S409 | 10.40 | 11.0925 | 2.411 | 1.847 | 23.8 |
| S410 | 10.60 | 68.6848 | VAS 402 | | |
| S411 | 15.70 | ASPHERE | 3.000 | 1.516 | 64.1 |
| S412 | 15.90 | −33.9288 | VAS 403 | | |
| | 16.03 | DIAPHRAGM | 9.517 | | |
| S413 | 16.64 | 19.3913 | 9.558 | 1.806 | 40.9 |
| S414 | 14.87 | −21.8160 | 0.635 | | |
| S415 | 14.80 | ASPHERE | 0.900 | 1.847 | 23.8 |
| S416 | 14.62 | 13.7192 | 1.227 | | |
| S417 | 15.94 | 20.2903 | 5.548 | 1.806 | 40.9 |
| S418 | 16.40 | −17.6929 | 5.000 | | |
| S419 | 13.30 | PLANO | 7.500 | 1.516 | 64.1 |
| S420 | 11.15 | PLANO | | | |

TABLE 7

FIG. 11

| EFFECTIVE FOCAL LENGTH | BACK FOCAL LENGTH | LENS LENGTH | VAS 401 | LENGTH OF VAS 402 | VAS 403 |
|---|---|---|---|---|---|
| 9.22 | 16.97 | 77.268 | 1.495 | 14.509 | 9.920 |
| 22.21 | 16.93 | 77.268 | 13.133 | 11.179 | 1.612 |
| 53.49 | 16.90 | 77.268 | 18.214 | 2.495 | 5.215 |

TABLE 8

FIG. 12

| SURFACE | CLEAR APERTURE | RADIUS | THICKNESS | REFRACTIVE INDEX | Abbé V NUMBER |
|---|---|---|---|---|---|
| S501 | 32.41 | 54.3724 | 0.900 | 1.805 | 25.4 |
| S502 | 30.84 | 26.7134 | 6.909 | 1.516 | 64.1 |
| S503 | 30.33 | -339.941 | 0.100 | | |
| S504 | 28.00 | 26.3356 | 4.855 | 1.691 | 54.8 |
| S505 | 27.09 | 137.475 | VAS 501 | | |
| S506 | 13.23 | -247.601 | 0.900 | 1.492 | 57.4 |
| S507 | 10.20 | ASPHERE | 3.519 | | |
| S508 | 10.09 | -11.8136 | 0.900 | 1.516 | 64.1 |
| S509 | 10.87 | 8.37217 | 2.989 | 1.590 | 30.9 |
| S510 | 11.08 | 70.8975 | VAS 502 | | |
| S511 | 16.00 | 63.1187 | 3.000 | 1.492 | 57.4 |
| S512 | 16.22 | -28.8454 | VAS 503 | | |
| | 16.37 | DIAPHRAGM | 3.431 | | |
| S513 | 16.89 | 13.4946 | 9.964 | 1.516 | 64.1 |
| S514 | 14.27 | -19.2823 | 1.000 | | |
| S515 | 13.60 | ASPHERE | 3.172 | 1.590 | 30.9 |
| S516 | 13.44 | 10.9714 | 1.112 | | |
| S517 | 14.70 | 14.3087 | 6.007 | 1.492 | 57.4 |
| S518 | 15.33 | -20.0016 | 0.500 | | |
| S519 | 15.27 | 21.5406 | 4.500 | 1.492 | 57.4 |
| S520 | 14.55 | -81.7220 | 5.000 | | |
| S521 | 11.95 | PLANO | 7.500 | 1.516 | 64.1 |
| S522 | 9.58 | PLANO | | | |

TABLE 9

FIG. 14

| EFFECTIVE FOCAL LENGTH | BACK FOCAL LENGTH | LENS LENGTH | LENGTH OF | | |
|---|---|---|---|---|---|
| | | | VAS 501 | VAS 502 | VAS 503 |
| 9.22 | 13.16 | 81.254 | 1.495 | 15.932 | 10.069 |
| 22.20 | 13.14 | 81.254 | 13.816 | 12.465 | 1.215 |
| 53.48 | 13.06 | 81.254 | 19.413 | 2.495 | 5.588 |

TABLE 10

FIG. 15

| SURFACE | CLEAR APERTURE | RADIUS | THICKNESS | REFRACTIVE INDEX | Abbé V NUMBER |
|---|---|---|---|---|---|
| S401 | 32.99 | 75.4264 | 0.900 | 1.805 | 25.4 |
| S402 | 31.58 | 30.0901 | 7.220 | 1.516 | 64.1 |
| S403 | 31.15 | -118.456 | 0.100 | | |
| S404 | 28.28 | 25.8903 | 4.857 | 1.691 | 54.8 |
| S405 | 27.20 | 121.226 | VAS 401 | | |
| S406 | 12.60 | 104.007 | 0.900 | 1.720 | 50.3 |
| S407 | 10.54 | 10.3313 | 2.982 | | |
| S408 | 10.10 | ASPHERE | 0.600 | 1.728 | 50.6 |
| S409 | 10.52 | 13.6679 | 2.377 | 1.847 | 23.8 |
| S410 | 10.75 | -947.418 | VAS 402 | | |
| S411 | 15.00 | 72.7809 | 3.000 | 1.697 | 55.5 |
| S412 | 15.32 | -43.6968 | VAS 403 | | |
| | 15.41 | DIAPHRAGM | 8.426 | | |
| S413 | 15.82 | 13.9159 | 8.800 | 1.806 | 40.9 |
| S414 | 13.13 | -30.8763 | 0.509 | | |
| S415 | 13.00 | ASPHERE | 1.000 | 1.844 | 23.8 |
| S416 | 11.94 | 10.1636 | 2.484 | | |
| S417 | 14.30 | 19.0335 | 6.100 | 1.804 | 46.5 |
| S418 | 14.80 | -19.0335 | 5.000 | | |
| S419 | 12.05 | PLANO | 7.500 | 1.516 | 64.1 |
| S420 | 9.98 | PLANO | | | |

TABLE 11

FIG. 16

| EFFECTIVE FOCAL LENGTH | BACK FOCAL LENGTH | LENS LENGTH | LENGTH OF | | |
|---|---|---|---|---|---|
| | | | VAS 401 | VAS 402 | VAS 403 |
| 9.24 | 14.34 | 79.211 | 1.300 | 18.148 | 9.508 |
| 22.20 | 14.29 | 79.211 | 13.813 | 13.373 | 1.771 |
| 52.49 | 14.30 | 79.211 | 19.191 | 1.050 | 8.715 |

TABLE 12

FIG. 17

| SURFACE | CLEAR APERTURE | RADIUS | THICKNESS | REFRACTIVE INDEX | Abbé V NUMBER |
|---|---|---|---|---|---|
| S401 | 32.99 | 60.4258 | 0.900 | 1.805 | 25.4 |
| S402 | 31.66 | 30.8765 | 6.423 | 1.516 | 64.1 |
| S403 | 31.21 | -184.883 | 0.100 | | |
| S404 | 28.35 | 26.7528 | 4.511 | 1.603 | 60.7 |
| S405 | 27.36 | 124.898 | VAS 401 | | |
| S406 | 12.40 | 59.3635 | 0.900 | 1.720 | 50.3 |
| S407 | 10.43 | 10.2374 | 2.876 | | |
| S408 | 10.09 | ASPHERE | 0.600 | 1.728 | 50.6 |
| S409 | 10.37 | 14.7870 | 2.203 | 1.847 | 23.8 |
| S410 | 10.44 | PLANO | VAS 402 | | |
| S411 | 14.60 | 100.761 | 3.000 | 1.697 | 55.5 |
| S412 | 15.00 | -40.5144 | VAS 403 | | |
| | 15.24 | DIAPHRAGM | 8.404 | | |
| S413 | 16.22 | 14.8190 | 8.800 | 1.806 | 40.9 |
| S414 | 13.86 | -30.3985 | 0.508 | | |
| S415 | 13.69 | ASPHERE | 1.000 | 1.844 | 23.8 |
| S416 | 12.70 | 11.2181 | 2.162 | | |
| S417 | 14.70 | 19.3072 | 6.500 | 1.786 | 43.9 |
| S418 | 15.24 | -19.3072 | 5.000 | | |
| S419 | 12.48 | PLANO | 7.500 | 1.516 | 64.1 |
| S420 | 10.42 | PLANO | | | |

TABLE 13

FIG. 18

|  EFFECTIVE FOCAL LENGTH | BACK FOCAL LENGTH | LENS LENGTH | LENGTH OF | | |
|---|---|---|---|---|---|
| | | | VAS 401 | VAS 402 | VAS 403 |
| 9.23 | 15.40 | 78.040 | 1.300 | 15.863 | 11.990 |
| 22.21 | 15.37 | 78.040 | 15.105 | 12.110 | 1.938 |
| 52.49 | 15.37 | 78.040 | 21.397 | 1.050 | 6.706 |

TABLE 14

FIG. 19

ZOOM LENS

CROSS-REFERENCE TO A RELATED APPLICATION

This application is a continuation-in-part of my earlier filed U.S. application Ser. No. 131,976, filed Dec. 11, 1987 now abandoned.

BACKGROUND OF THE INVENTION

1. Field of the Invention

This invention relates to zoom lenses for photographic purposes, more particularly but not exclusively, for video movie cameras 2. Prior Art U.S. Patent Specification No. 3,524,696 which draws priority from a Japanese Patent application filed in 1967, discloses a zoom lens including twelve elements arranged in four units. There is a positive unit facing the long conjugate and movable for focussing. There is a negative unit movable for zooming. There is a second positive unit which is movable for zooming and there is a rear unit which is stationary. The positive unit facing the long conjugate consists of a cemented doublet and a single element therebehind. The negative unit consists of a negative element and a negative doublet concave towards each other. The second positive unit consists of a single component including at least one positive element.

In U.S. Pat. No. 3,524,696, the fourth unit consists of a positive element, a negative element and a doublet consisting of a negative element and a positive element.

The zoom lens described in U.S. Pat. No. 3,524,696 has a zoom range of only 2× and a f-number of only 3.5.

In the ensuing twenty years there have been several proposals for zoom lenses in which the first three units are similar to those of U.S. Pat. No. 3,524,696 and with differing rear units. For example, in U.S. Patent Specification No. 4,105,291 the rear unit includes six elements which are positive, positive, negative, positive, positive and negative, in power, respectively. The zoom lens of U.S. Pat. No. 4,105,291 has a zoom range of only 2.8 and a f-number smaller than 1.0.

In U.S. Patent Specification No. 4,096,586, the behind the rearmost moving unit there are two units including six elements of positive, positive, negative, positive, negative and positive powers, respectively. That known zoom lens has a zoom ratio of 2.7 and a f-number of 1.4.

In U.S. Patent Specification No. 4,368,954, there is disclosed a zoom lens having a rear unit including five elements which have positive, negative, positive, positive, negative powers, respectively. That zoom lens has a zoom ratio of about 4.7 and a f-number of 1.26.

In U.S. Patent Specification No. 4,380,377, the zoom lens there disclosed has four elements behind the rearmost moving unit, divided into two spaced sub-units. The elements have positive, negative, negative and positive powers, respectively. That zoom lens has a zoom range of about 2.9 and a f-number of 1.26.

In U.S. Patent Specification No. 4,456,341, the zoom lens therein disclosed has five elements behind the rearmost moving unit, divided into two spaced sub-units. Those five elements have positive, positive, negative, negative and positive powers, respectively. That zoom lens has a zoom ratio of 2.1 and a f-number of 1.4.

In U.S. Patent Specification No. 4,629,292, the zoom lens therein disclosed has four elements in the rear unit and they have positive, negative, positive, negative powers, respectively. That zoom lens has a zoom ratio of 2.9 and a f-number of 1.4.

It is an object of the present invention to provide a zoom lens having in combination a higher zoom ratio, superior f-number and fewer elements than the zoom lenses of the prior art.

SUMMARY OF THE INVENTION

The present invention achieves its object by having a rear unit of lens elements which consists of a triplet or "triplet derivative" wherein any element additional to three is a positive element.

Advantageously, an element in the rear unit has an aspheric surface.

In embodiments wherein the aspheric surface is a concave surface, the aspheric deformation terms may cause the sag to be less in absolute value than the absolute value of the sag determined by the base curve.

In embodiments wherein the aspheric surface is a convex surface, the aspheric deformation terms may cause the sag to be greater in absolute value than the absolute value of the sag determined by the base curve.

Advantageously, in some embodiments of the invention, the distance from the front vertex to the image plane is less than twice the maximum focal length of the lens.

In other advantageous embodiments of the present invention, the clear aperture of the front element of the lens is less than 80% of the maximum focal length of the lens, and the relative illumination is 40% or greater at both the maximum and the minimum focal length. This condition can be achieved by increasing the vignetting (V) of the lens and hence reducing the Relative Illumination (R.I.) of the lens.

Relative Illumination is defined as:

$$R.I. = (1-V) \times \cos^4 \theta$$

wherein $\theta$ is the exiting angle that the principle ray makes with the optical axis and the vignetting is defined as the absolute value of the difference between the area of the axial exit pupil determined by the axial bundle, and the area of the off axis exit pupil determined by the maximum obliquity, divided by the area of the axial exit pupil. The axial exit pupil is the image of the stop created by all the elements succeeding the stop. The area of the off axis exit pupil is limited by the lens diameters. The axial exit pupil area of the axial beam is assumed to be computed when the lens is at its fastest f-number.

BRIEF DESCRIPTION OF THE DRAWINGS

Embodiments of the present invention will now be described, by way of example, with reference to the accompanying drawings, in which:

FIG. 2 is Table 1 giving certain parameters and characteristics of the lens represented in FIG. 1;

FIG. 3 is Table 2 giving other parameters and characteristics of the lens illustrated in FIG. 1;

FIG. 5 is Table 3 giving certain parameters and characteristics of the lens represented in FIG. 4;

FIG. 6 is Table 4 giving other parameters and characteristics of the lens illustrated in FIG. 4;

FIG. 8 is Table 5 giving certain parameters and characteristics of the lens represented in FIG. 7;

FIG. 9 is Table 6 giving other parameters and characteristics of the lens illustrated in FIG. 7;

FIG. 11 is Table 7 giving certain parameters and characteristics of the lens represented in FIG. 10;

FIG. 12 is Table 8 giving other parameters and characteristics of the lens illustrated in FIG. 10;

FIG. 14 is Table 9 giving certain parameters and characteristics of the lens represented in FIG. 13;

FIG. 15 is Table 10 giving other parameters and characteristics of the lens illustrated in FIG. 13;

FIG. 16 is Table 11 giving certain parameters and characteristics of a sixth embodiment of the present invention;

FIG. 17 is Table 12 giving other parameters and characteristics of the sixth embodiment;

FIG. 18 is Table 13 giving certain parameters and characteristics of a seventh embodiment of the present invention; and FIG. 19 is Table 14 giving other parameters and characteristics of the seventh embodiment.

DETAILED DESCRIPTION OF THE PREFERRED EMBODIMENT

All linear dimensions in this Specification are millimeters unless specified otherwise.

Figure 1:
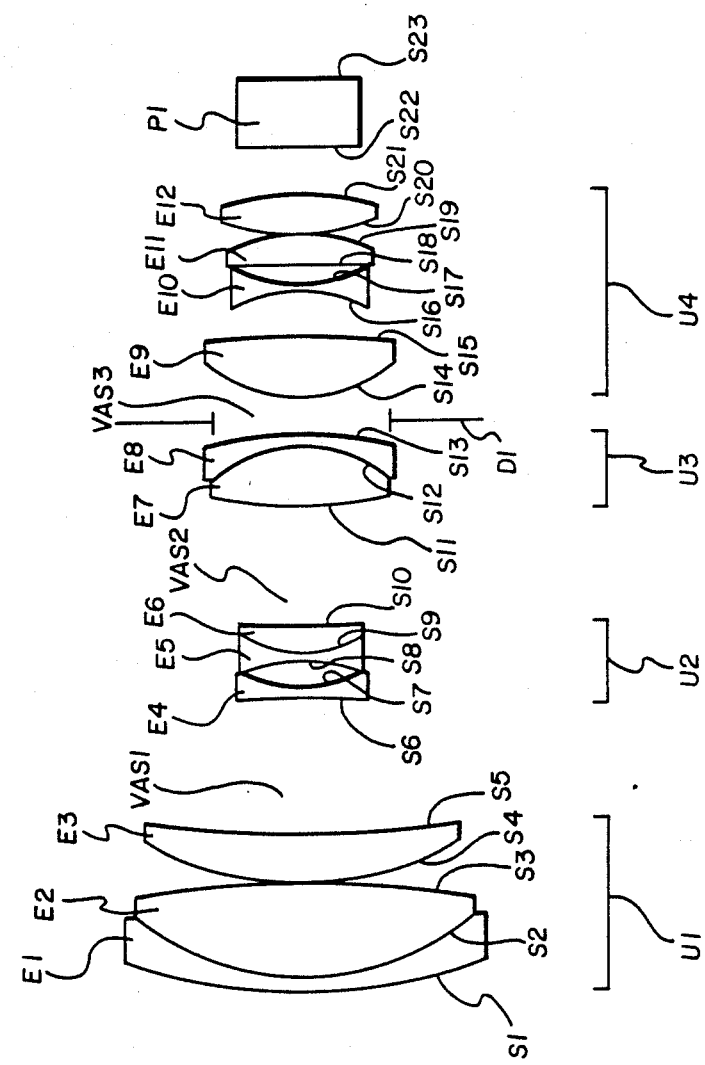
FIG. 1 is a diagram of a first embodiment of the present invention.

FIG. 1 illustrates a first embodiment of the present invention in the form of a zoom lens having a 6 to 1 zoom ratio and intended to be used as the taking lens in a video movie camera. The lens includes twelve elements E1 to E12 arranged in four units U1 to U4. The first and fourth units, U1 and U4 respectively, are stationary for a fixed object distance and the second and third, U2 and U3, respectively, move for zooming. The first unit U1 moves for focussing. Thus, there are variable air spaces VAS1, VAS2 and VAS3 between the first and second units U1 and U2, the second and third units U2 and U3, and the third and fourth units U3 and U4, respectively. Behind the element E12 there is a plano element P1 which is representative of planos which are present at this location for anti-aliasing purpose or they may be, for example, prism blocks. Such elements, while having no power, do affect the aberrations, and hence the lens is designed taking into account the optical effects of the representative plano P1. In all the embodiments herein disclosed, the representative planos are designed with a representative thickness of 7.5 mm. and a refractive index of 1.516 and in all the embodiments they are located behind the last lens element.

The first and second lens elements E1 and E2 are in the form of a positive cemented doublet; the element E1 being a negative meniscus and the element E2 being biconvex. The third element E3 of the first unit U1 is a positive meniscus.

The second unit U2 includes a first element E4 which is biconcave. The second and third elements E5 and E6 of the second unit U2 are formed as a negative cemented doublet; the element E5 being biconcave and the element E6 being positive meniscus.

The third unit U3 includes two elements E7 and E8 formed as a positive cemented doublet. The element E7 is biconvex and the element E8 is a negative meniscus.

A diaphragm D1 is close to the unit U3 between the latter and the fourth unit U4.

The fourth unit U4 consists of a triplet derivative and includes an element E9 which is biconvex; element E10 which is biconcave; element E11 which is biconvex; and element E12 which is biconvex. Thus, the fourth unit U4 is a derivative of a triplet in that the element E12 additional to the positive, negative and positive elements E9, E10 and E11 forming the triplet, is itself positive. The elements E10, E11 and E12 are formed as a sub-unit with airspaces between it and the element E9 and the plano element P1. The front surface S16 of the biconcave element E10 is aspheric. The aspheric equation is:

$$X = \frac{CY^2}{1 + \sqrt{1 - (K+1)C^2Y^2}} + DY^4 + EY^6 + FY^8$$

The values of the terms C, D, E, F and K for surface

| | |
|---|---|
| C = | $-0.0646569$ |
| D = | $-0.1617108^{-3}$ |
| F = | $-0.6633698^{-8}$ |
| K = | $-4.0775560$ |
| E = | $0.1783292^{-5}$ |
| VERTEX RADIUS = | $-15.4663$ |

FIG. 2 is Table 1 which gives various parameters of the lens illustrated in FIG. 1, including the radii of the surfaces S1 to S23 of the elements E1 to E12 and of the plano P1. As is conventional, the two contiguous surfaces of a cemented doublet are given the same reference symbol, e.g. S2.

FIG. 3 is Table 2 which gives further parameters for the lens illustrated in FIG. 1.

The effective focal length of the lens illustrated in FIG. 1 ranges from 9.22 to 53.49. Thus the zoom ratio is 5.8 to 1 which, as is customary, qualifies the lens to be termed a 6 to 1 zoom lens. The f-number of the lens varies from 1.23 to 1.65 through the zoom range. The values given in Table 2 for the back focal length are calculated for air between the rear element E12 and the image plane. The physical distance, with the plano element P1 present, would be different. The maximum focal length of the lens is 53.49. It will be observed that the distance from the front vertex to the image plane (i.e., the lens length plus the back focal length) is 97.55 mm. and that this is at most 1.82 times the maximum focal length of the lens.

The semi-field angle of the lens illustrated in FIG. 1 varies from 24.38° to 4.11° through the zoom range; thus, the total coverage of the lens, at the extreme wide angle condition, is 48.76°.

The front clear aperture is 38.9 mm. which is 72% of the maximum focal length and the Relative Illumination is 0.42 and 0.47 for the minimum or maximum focal lengths, respectively.

Figure 4:
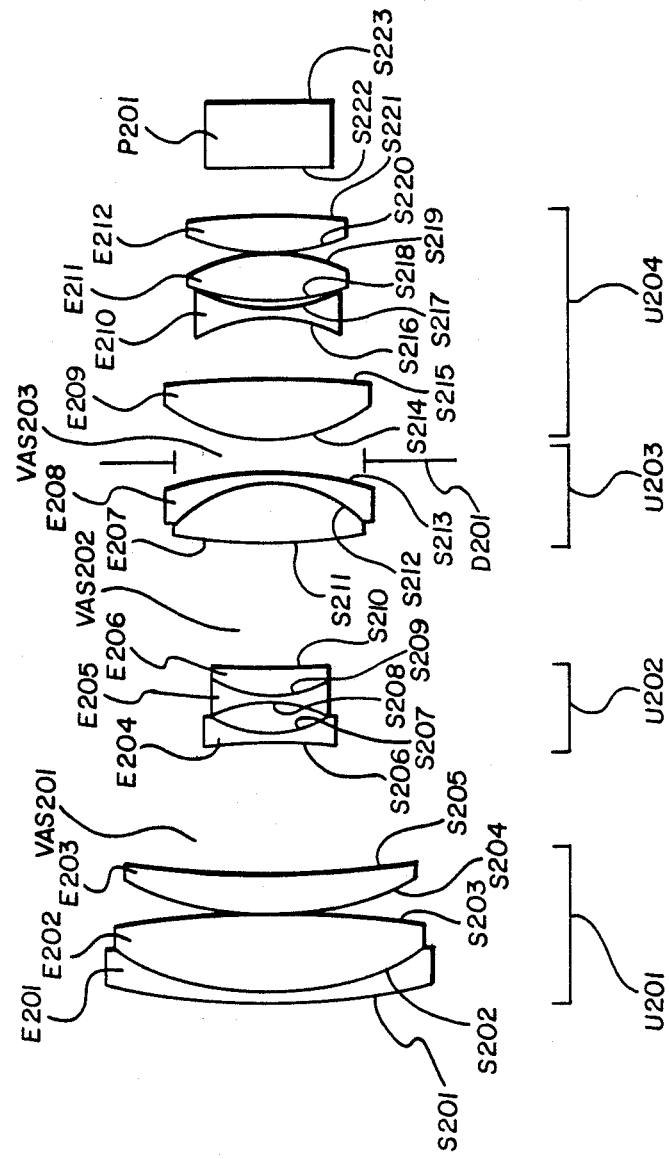
FIG. 4 is a diagram of a second embodiment of the present invention.

FIG. 4 illustrates a second embodiment of the present invention in the form of a zoom lens having a 6 to 1 zoom ratio and again intended to be used as the taking lens in a video movie camera. The lens includes twelve elements E201 to E212 arranged in four units U201 to U204. This embodiment is also illustrated with a representative plano P201 the nature and purpose of which is similar to the plano P1 in the first embodiment herein and reference is directed to the description of the first embodiment for an understanding.

The first and fourth units, U201 and U204, respectively, are stationary for a fixed object distance and the second and third units, U202 and U203, respectively, move for zooming. The first unit U201 moves for focussing. Thus, there are variable air spaces VAS201, VAS202 and VAS203 between the first and second units U201 and U202, the second and third units U202 and U203, and the third and fourth units U203 and U204, respectively.

In the second embodiment illustrated in FIG. 4, the types of the elements, their formation in doublets and their arrangement in units, are the same as for the elements to which they correspond in the first embodiment illustrated in FIG. 1, so further description will not be given and for an understanding of them, reference is directed to the description of the first embodiment herein. The surfaces and variable air spaces in the second embodiment are given the same reference symbols as the surfaces and variable air spaces to which they correspond in the first embodiment, but with the addition of 200 to the numerical part of the symbol.

In this second embodiment also, the fourth unit is a triplet derivative with the element E212 additional to the positive, negative, positive elements E209, E210 and E211 forming the triplet, being a positive element.

A diaphragm D201 is close to the unit U203 between the latter and the fourth unit U204.

FIG. 5 is Table 3 which gives various parameters of the lens illustrated in FIG. 4, including the radii of the surfaces S201 to S223 of the elements E201 to E212, and of the plano P211.

The front surface of the biconcave element E210 is an asphere with the equation:

$$X = \frac{CY^2}{1 + \sqrt{1 - (K + 1) C^2 Y^2}} + DY^4 + EY^6 + FY^8$$

The values of the terms C, D, E, F and K for the surface S216 are:

```
C = -0.0636829
D = -0.1533871^{-3}
F = -0.3029987^{-8}
K = -4.077556
E = 0.1291248^{-5}
VERTEX RADIUS = -15.7028
```

FIG. 6 is Table 4, similar to Table 2, which gives further parameters for the lens illustrated in FIG. 4.

The effective focal length of the lens illustrated in FIG. 4 ranges from 9.22 to 53.49. Thus, the zoom ratio is 5.8 to 1 which, as is customary, qualifies the lens to be termed a 6 to 1 zoom lens. The f-number of the lens varies from 1.23 to 1.68 through the zoom range. The values given in Table 4 for the back focal length are calculated for air between the rear element E311 and the image plane. The physical distance, with the plano element P301 present, would be different. The maximum focal length of the lens is 53.49 mm. It will be observed that the distance from the front vertex to the image plane (i.e., the lens length plus the back focal length) is 98.36 mm and that this is at most 1.84 times the maximum focal length of the lens.

The semi-field angle of the lens illustrated in FIG. 4 varies from 24.38° to 4.11° through the zoom range; thus, the total coverage of the lens, at the extreme wide angle condition, is 48.76°.

The front clear aperture is 34 mm which is 72% of the maximum focal length and the Relative Illumination is 0.40 and 0.47 for the minimum and maximum focal lengths, respectively.

Figure 7:
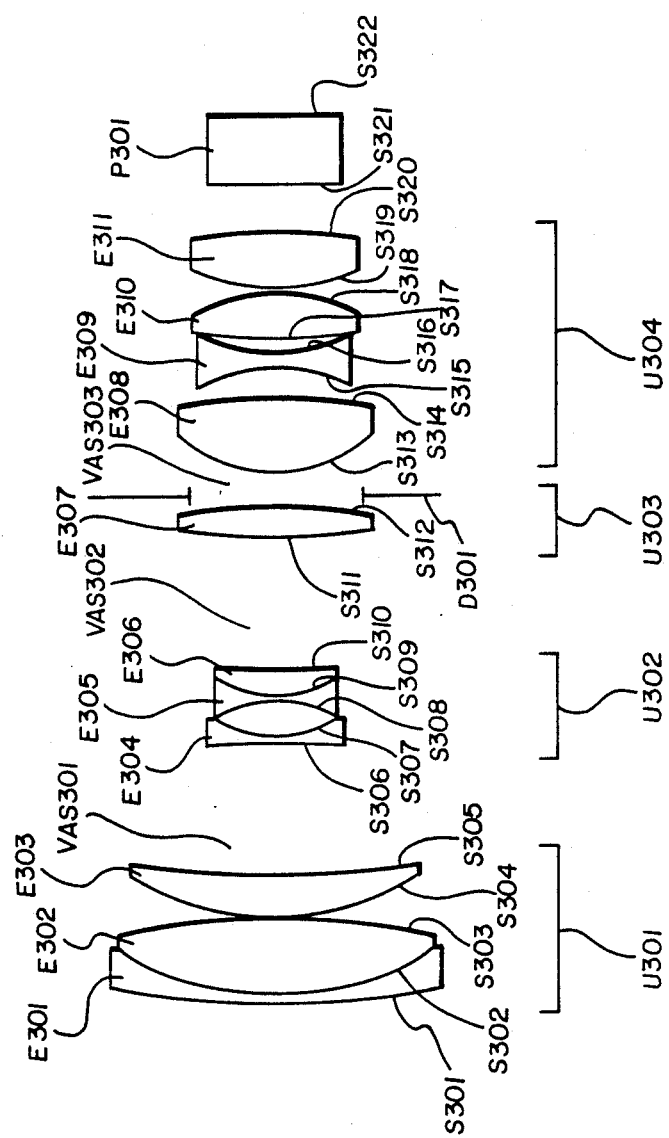
FIG. 7 is a diagram of a third embodiment of the present invention.

FIG. 7 illustrates a third embodiment of the present invention; again a 6 to 1 zoom lens intended to be the taking lens of a video movie camera, which differs from the first and second embodiments in that the third unit is a single element rather than a cemented doublet. The lens illustrated in FIG. 7 includes eleven elements E301 to E311, again arranged in four units U301 to U304, and there is a representative plano P301 behind the lens. For an understanding of the plano P301 and its purpose and function reference is directed to the description of the plano P1 in the first embodiment herein described.

The first and fourth units, U301 and U304, respectively, are stationary for a fixed object distance and the second and third, U302 and U303, respectively, move for zooming. The first unit U301 moves for focussing. Thus, there are variable air spaces VAS301, VAS302 and VAS303 between the first and second units U301 and U302, the second and third units U302 and U303, and the third and fourth units U303 and U304, respectively.

The first and second lens elements E301 and E302 are in the form of a positive cemented doublet; the element E301 being a negative meniscus and the element E302 being biconvex. The third element E303 of the first unit U301 is a positive meniscus.

The second unit U302 includes a first element E304 which is biconcave. The second and third elements E305 and E306 of the second unit U302 are formed as a negative cemented doublet. The element E305 is biconcave and the element E306 is positive meniscus.

The third unit U303, in this embodiment includes a single element E307 which is biconvex and its front surface S311 is aspheric.

A diaphragm D301 is close to the unit U303 between the latter and the fourth unit U304.

The fourth unit U304 consists of element E308 which is biconvex; element E309 which is biconcave; element E310 which is biconvex; and element E311 which is biconvex. The fourth unit U304 is a triplet derivative in that the positive element E311 additional to the positive, negative and positive elements E308, E309, E310 forming the triplet, is positive. Behind the rear element 311 is the plano. The elements E309 and E310 are formed as a sub-unit with airspaces between it and the elements E308 and E311. The front surface S315 of the element E309 is aspheric.

FIG. 8 is Table 5 which gives various parameters of the lens illustrated in FIG. 7, including the radii of the surfaces S301 to S320 of the elements E301 to E311. As in descriptions of all of the embodiments described herein, the two contiguous surfaces of a cemented doublet are given the same reference symbol, e.g. S309.

The aspheric equation for the surfaces S311 and S315 is:

$$X = \frac{CY^2}{1 + \sqrt{1 - (K+1)C^2Y^2}} + DY^4 + EY^6 + FY^8$$

The values of the terms C, D, E, F and K are:

| for surface S311: | |
|---|---|
| C = | 0.0187374 |
| D = | 0.0 |
| F = | 0.0 |
| K = | −9.3755340 |
| E = | 0.0 |
| VERTEX RADIUS = | 53.3691 |
| for surface S315: | |
| C = | −0.0579609 |
| D = | $-0.1066331^{-3}$ |
| F = | $-0.2321880^{-8}$ |
| K = | −4.0775560 |
| E = | $0.9030583^{-6}$ |
| VERTEX RADIUS = | −17.253 |

FIG. 9 is Table 6 which gives further parameters for the lens illustrated in FIG. 7.

The effective focal length of the lens illustrated in FIG. 7 ranges from 9.22 to 53.50. Thus the zoom ratio is 5.8 to 1 which, as is customary, qualifies the lens to be termed a 6 to 1 zoom lens. The f-number of the lens varies from 1.23 to 1.68 through the zoom range. The values given in Table 6 for the back focal length are calculated for air between the rear element E211 and the image plane. The physical distance, with the plano element P301 present, would be different. The maximum focal length of the lens is 53.50 mm. It will be observed that the distance from the front vertex to the image plane (i.e., the lens length plus the back focal length) is 96.83 mm and that this is at most 1.81 times the maximum focal length of the lens.

The semi-field angle of the lens illustrated in FIG. 7 varies from 24.38° to 4.11° through the zoom range; thus the total coverage of the lens, at the extreme wide angle condition, is 48.76°.

The front clear aperture is 34.4 mm which is 64% of the maximum focal length and the Relative Illumination is 0.40 and 0.48 for the minimum and maximum focal lengths, respectively.

Figure 10:
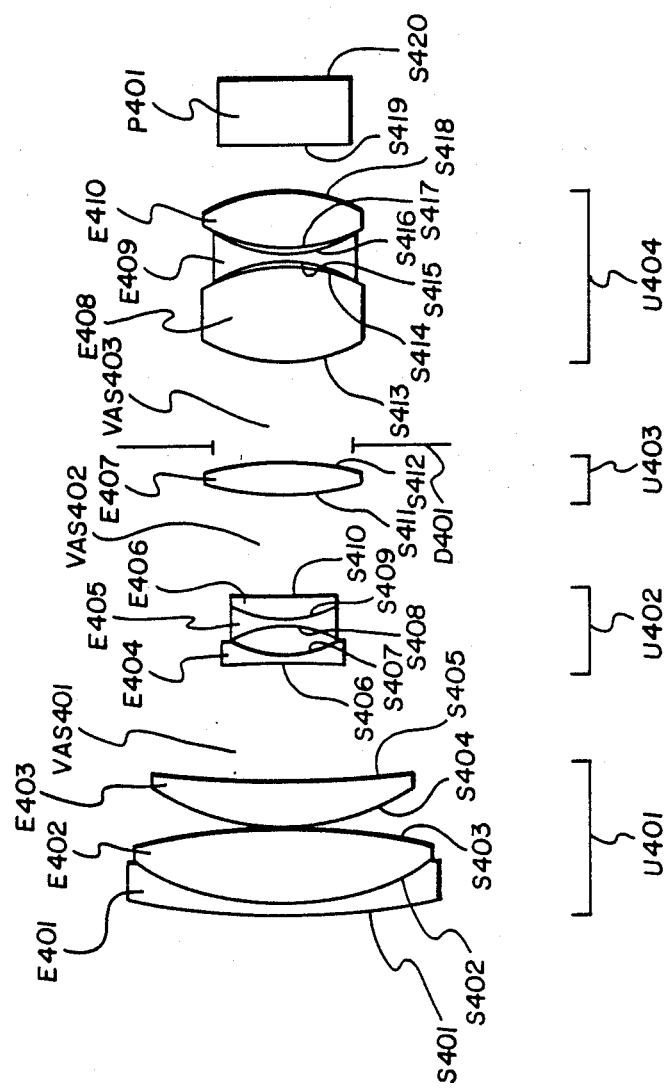
FIG. 10 is a diagram of a fourth embodiment of the present invention.

FIG. 10 illustrates a fourth embodiment of the present invention again in the form of a zoom lens having a 6 to 1 zoom ratio and again intended to be used as the taking lens in a video movie camera. The lens includes ten elements E401 to E410 arranged in four units U401 to U404. This embodiment is also illustrated with a representative plano P401 the nature and purpose of which is similar to the plano P1 in the first embodiment herein and reference is directed thereto for an understanding.

The first and fourth units, U401 and U404, respectively, are stationary for a fixed object distance and the second and third units, U402 and U403, respectively, move for zooming. The first unit U401 moves for focussing. Thus, there are variable air spaces VAS401, VAS402 and VAS403 between the first and second units U401 and U402, the second and third units U402 and U403, and the third and fourth units U403 and U404, respectively.

In the fourth embodiment illustrated in FIG. 10, the fourth unit U404 is a triplet rather than a triplet derivative as in the first three embodiments herein and, as such, has one less element than the fourth unit U304 in the third embodiment herein described with reference to FIGS. 7 to 9. In the first three units U401 to U403 of the fourth embodiment illustrated in FIG. 10, the types of the elements, their formation in doublets and their arrangement in units, are the same as for the units to which they correspond in the third embodiment illustrated in FIG. 7, so further description will not be given and for an understanding of them, reference is directed to the description of the third embodiment herein. The surfaces and variable air spaces in the first three units of the fourth embodiment are given the same reference symbols as the surfaces and variable air spaces to which they correspond in the third embodiment, but with the addition of 100 to the numerical part of the symbol.

A diaphragm D401 is close to the unit U403 between the latter and the fourth unit U404. There is a representative plano P401 behind the lens. For an understanding of the nature and purpose of the plano P401 reference is directed to the description of the foregoing embodiments herein. The fourth unit U404 of the fourth embodiment includes a biconvex element E408, a biconcave element E409 and a biconvex element E410.

FIG. 11 is Table 7 which gives various parameters of the lens illustrated in FIG. 10, including the radii of the surfaces S401 to S418 of the elements E401 to E410, and of the plano P401. In this fourth embodiment of the invention, the front surface S411 of the single biconvex element E407 forming the third unit U403, is aspheric. Also the front surface S415 of the biconvex element E409, which is the second element in the fourth unit U404, is aspheric. The aspheric equation is:

$$X = \frac{CY^2}{1 + \sqrt{1 - (K+1)C^2Y^2}} + DY^4 + EY^6 + FY^8 + GY^{10}$$

The values of the terms C, D, E, F, G and K in the aspheric equation for the two aspheric surfaces are as follow:

| Surface S411 | |
|---|---|
| C = | .0324035 |
| D = | 0.0 |
| F = | 0.0 |
| K = | −5.84099 |
| E = | 0.0 |
| G = | 0 |
| VERTEX RADIUS = | 30.8609 |
| Surface S415 | |
| C = | −0.0666265 |
| D = | $-0.5318318^{-4}$ |
| F = | $-0.2140706^{-8}$ |
| K = | −0.7570620 |
| E = | $0.7207075^{-6}$ |
| G = | $0.3281086^{-10}$ |
| VERTEX RADIUS = | −15.0090 |

FIG. 12 is Table 8, similar to Table 2, which gives further parameters for the lens illustrated in FIG. 10.

The effective focal length of the lens illustrated in FIG. 10 ranges from 9.22 to 53.49 mm. Thus, the zoom ratio is 5.8 to 1 which, as is customary, qualifies the lens to be termed a 6 to 1 zoom lens. The f-number of the lens varies from 1.43 to 1.85 through the zoom range. The values given in Table 8 for the back focal length are calculated for air between the rear element E410 and the image plane. The physical distance, with the plano element P401 present, would be different. The maximum focal length of the lens is 53.49 mm. It will be observed that the distance from the front vertex to the image plane (i.e., the lens length plus the back focal length) is 94.24 mm and that this is at most 1.76 times the maximum focal length of the lens.

The semi-field angle of the lens illustrated in FIG. 10 varies from 24.38° to 4.11° through the zoom range; thus, the total coverage of the lens, at the extreme wide angle condition, is 48.76°.

The front clear aperture is 32.59 mm which is 60% of the maximum focal length and the Relative Illumination is 0.40 and 0.47 for the minimum and maximum focal lengths, respectively.

Figure 13:
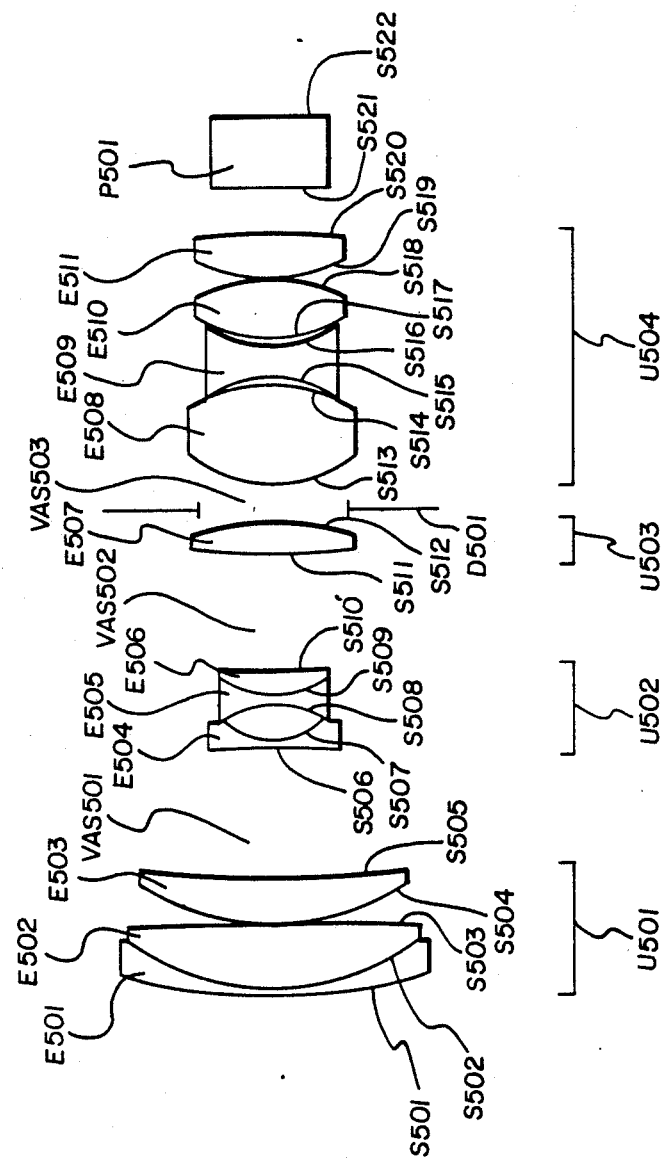
FIG. 13 is a diagram of a fifth embodiment of the present invention.

FIG. 13 illustrates a fifth embodiment of the present invention which also is intended to be the taking lens of a video movie camera. This embodiment differs from the other four embodiments in that it includes six elements formed of plastics material whereas in the other embodiments the elements are all formed of glass. Like the fourth embodiment, the fifth embodiment includes two aspheric surfaces. Like the first, second and third embodiments, but unlike the fourth embodiment, the fifth embodiment has, as its fourth unit, a triplet derivative.

The fifth embodiment includes eleven elements E501 to E511 arranged in four units U501 to U504. In this embodiment also, there is a representative plano element P501 behind the rear element E511. The types of the elements in the first second and third units U501, U502 and U503, and their arrangement in units and as doublets, etc., are substantially identical to the corresponding elements in the fourth and third embodiments and reference is made to the descriptions of those other two embodiments for an understanding of the elements in the first three units this fourth embodiment.

The fourth unit U504 includes a biconvex element E508; a biconcave element E509; a biconvex element E510 and a rear biconvex element E511. In that the fourth unit includes element E511 which is positive and additional to the positive negative and positive elements E508, E509 and E510, the fourth unit is a triplet derivative. Behind the rear element of the fourth unit there is a representative plano element P501 and for an understanding of its nature and purpose, reference is made to the foregoing embodiments herein described.

Some parameters of the lens illustrated in FIG. 13 and of the plano P501 are given in Table 9 which is FIG. 14. As can be seen in Table 9, the surfaces S507 and S515 are aspheric. The aspheric equation is:

$$X = \frac{CY^2}{1 + \sqrt{1 - (K+1)C^2Y^2}} + DY^4 + EY^6 + FY^8 + GY^{10}$$

The values of the terms C, D, E, F, G, and K in the aspheric equation are as follow:

For surface S507
C = 0.1371033
D = −0.8069293$^{-4}$
F = 0.0
K = −0.0095560
−0.1065725$^{-5}$ = E
G = 0.0
VERTEX RADIUS = 7.2938

For surface S515
C = −0.0790012
D = −0.1171127$^{-3}$
F = −0.1260090$^{-7}$
K = −1.5492770
E = 0.1413820$^{-5}$
G = 0.9930528$^{-10}$

VERTEX RADIUS = −12.6580

The effective focal length of the lens illustrated in FIG. 13 ranges from 9.22 to 53.48 mm. Thus, the zoom ratio is 5.8 to 1 which, as is customary, qualifies the lens to be termed a 6 to 1 zoom lens. The f-number of the lens varies from 1.43 to 1.85 through the zoom range. The values given in Table 10 for the back focal length are calculated for air between the rear element E511 and the image plane. The physical distance, with the plano element P501 present, would be different. The maximum focal length of the lens is 53.48 mm. It will be observed that the distance from the front vertex to the image plane (i.e., the lens length plus the back focal length) is 94.41 mm and that this is at most 1.77 times the maximum focal length of the lens.

The semi-field angle of the lens illustrated in FIG. 13 varies from 24.38° to 4.11° through the zoom range; thus, the total coverage of the lens, at the extreme wide angle condition, is 48.76°.

The front clear aperture is 32.41 mm which is 61% of the maximum focal length and the Relative Illumination is 0.40 and 0.47 for the minimum and maximum focal lengths, respectively.

The particular arrangement of the plastics material elements in the lens illustrated in FIG. 13 has been found to give good temperature compensation. It is believed that the good temperature compensation is achieved in a zoom lens having plastics material elements by having at least one positive focal length glass element in the base unit (i.e. the unit which is not part of a moving unit and which is usually located behind the moving elements) and by having at least one glass negative focal length element in the negative focal length unit. In the fifth embodiment illustrated in FIG. 13 the following elements are glass: E501; E502; E503; E505; and E508. The remaining elements, namely: E504; E506; E507; E509; E510; and E511 are formed of plastics material. It will be seen that the base unit, namely unit U504, has at least one glass element of positive focal length, namely element E508. It will also be seen that the negative unit, namely unit U502, has at least one glass element of negative focal length, namely element E505.

A sixth embodiment of the present invention has ten elements of types, and in an arrangement, similar to the fourth embodiment illustrated in, and described with reference to, FIG. 10 of the accompanying drawings, and reference is directed to that Figure and that description for an understanding of the sixth embodiment. In the sixth embodiment there are, again, two aspheric surfaces, but they are on surfaces S408 and S415 instead of surfaces S411 and S415. The aspheric equation for the two surfaces is as given above in relation to the fourth embodiment and the values of the terms C, D, E, F, G and K in the aspheric equation, for the two surfaces, are as follow:

Surface S408
C = −0.07114602
D = −0.4431$^{-4}$
E = −0.1143$^{-5}$
F = 0.1390$^{-7}$
G = 0
K = −1.3254
VERTEX RADIUS = −14.0556

-continued

Surface S415
C = −0.05164596
D = −0.5555$^{-4}$
E = 0.1490$^{-5}$
F = −0.8421$^{-8}$
G = 0.5381$^{-10}$
K = −0.0667

FIG. 16 is Table 11 which gives various parameters of the lens which is the sixth embodiment and is as illustrated in FIG. 10.

FIG. 17 is Table 12, similar to Table 2, which gives further parameters for the sixth embodiment.

The effective focal length of the sixth embodiment varies from 9.24 to 52.49 mm. Thus, the zoom ratio is 5.68 to 1 which, as is customary, qualifies the lens to be termed a 6 to 1 zoom lens. The f-number of the lens varies from 1.43 to 1.85 through the zoom range. The values given in Table 12 for the back focal length are calculated for air between the rear element E410 and the image plane. The physical distance, with the plano element P401 present, would be different. The maximum focal length of the lens is 52.49 mm. It will be observed that the distance from the front vertex to the image plane (i.e., the lens length plus the back focal length) is 93.55 mm and that this is, at most, 1.78 times the maximum focal length of the lens.

The semi-field angle of the lens forming the sixth embodiment varies from 24.81° to 4.26° through the zoom range; thus, the total coverage of the lens, at the extreme wide angle condition, is 49.62°.

The front clear aperture is 32.99 mm which is 63% of the maximum focal length and the Relative Illumination is 0.31 and 0.44 for the minimum and maximum focal lengths, respectively.

A seventh embodiment of the present invention has ten elements of types, and in an arrangement, similar to the fourth embodiment illustrated in, and described with reference to, FIG. 10 of the accompanying drawings, and reference is directed to that Figure and that description for an understanding of the seventh embodiment. In the seventh embodiment there are, again, two aspheric surfaces, but, as in the sixth embodiment, they are on surfaces S408 and S415 instead of surfaces S411 and S415. The aspheric equation for the two surfaces is as given above in relation to the fourth embodiment and the values of the terms C, D, E, F, G and K in the aspheric equation, for the two surfaces, are as follow:

Surface S408
C = −0.07395629
D = −0.36075$^{-4}$
E = −0.85039$^{-6}$
F = 0.856744$^{-7}$
G = 0
K = −0.9493
VERTEX RADIUS = −13.5215

Surface S415
C = −0.04710493
D = −0.60469$^{-4}$
E = 0.12213$^{-5}$
F = −0.75038$^{-8}$
G = 0.53814$^{-10}$
K = −0.06695
VERTEX RADIUS = −21.2292

FIG. 18 is Table 13 which gives various parameters of the lens which is the seventh embodiment and is as illustrated in FIG. 10.

FIG. 19 is Table 14, similar to Table 2, which gives further parameters for the sixth embodiment.

The effective focal length of the sixth embodiment varies from 9.23 to 52.49 mm. Thus the zoom ratio is 5.69 to 1 which, as is customary, qualifies the lens to be termed a 6-to-1 zoom lens. The f-number of the lens varies from 1.43 to 1.85 through the zoom range. The values given in Table 14 for the back focal length are calculated for air between the rear element E410 and the image plane. The physical distance, with the plano element P401 present, would be different. The maximum focal length of the lens is 52.49 mm. It will be observed that the distance from the front vertex to the image plane (i.e., the lens length plus the back focal length) is 93.44 mm and that this is at most 1.78 times the maximum focal length of the lens.

The semi-field angle of the lens forming the seventh embodiment varies from 24.81° to 4.26° through the zoom range; thus, the total coverage of the lens, at the extreme wide angle condition, is 49.62°.

The front clear aperture is 32.99 mm which is 63% of the maximum focal length and the Relative Illumination is 0.31 and 0.46 for the minimum and maximum focal lengths, respectively.

In both the sixth and seventh embodiments, as in the fourth embodiment, the fourth unit is a triplet.

In the fourth, fifth, sixth and seventh embodiments described above and illustrated in FIGS. 10 and 13, there are aspheric surfaces. An aspheric surface could be adopted on any element in the fourth unit, which is the unit behind the zooming unit, and the preferable element to have the aspheric surface is the negative element.

In Tables 2, 4, 6, 8, 10, 12 and 14 the lengths given for the variable air spaces, VAS1 etc., are the values when the lens is focussed at infinity.

In the ensuing Table 15, for each of the seven embodiments, the maximum focal length, 80% of the maximum focal length and the value of the clear aperture of the front lens element, are given. It will be seen that in each case the front clear aperture is less than 80% of the maximum focal length.

| EMBODIMENT | MAXIMUM FOCAL LENGTH MFL | MFL × .8 | FRONT CLEAR APERTURE |
|---|---|---|---|
| 1 | 53.49 | 42.79 | 38.90 |
| 2 | 53.49 | 42.79 | 34.00 |
| 3 | 53.50 | 42.80 | 34.40 |
| 4 | 53.49 | 42.79 | 32.59 |
| 5 | 53.48 | 42.78 | 32.41 |
| 6 | 52.49 | 41.99 | 32.99 |
| 7 | 52.49 | 41.99 | 32.99 |

In the seven embodiments herein described, the aspheric surface which is on a concave surface rearward of the last moving unit has a value according to the following Table 16:

| EMBODIMENT | SURFACE | Sag base curve "Sag 1" | Absolute Value of Sag with asphere "Sag 2" |
|---|---|---|---|
| | S16 | 1.624 | 1.564 |

-continued

| EMBODIMENT | SURFACE | Sag base curve "Sag 1" | Absolute Value of Sag with asphere "Sag 2" |
|---|---|---|---|
| 2 | S216 | 1.712 | 1.668 |
| 3 | S315 | 1.887 | 1.792 |
| 4 | S415 | 1.951 | 1.892 |
| 5 | S515 | 1.982 | 1.907 |
| 6 | S415 | 1.730 | 1.645 |
| 7 | S415 | 2.002 | 1.961 |

It will be observed that in each embodiment the aspheric deformation terms cause the sag to be less in absolute value than the absolute value of the sag determined by the base curve i.e., Sag 2 is less than Sag 1. In the sixth and seventh embodiments this phenomenon occurs when the clear aperture exceeds 14 mm.

Those skilled in the art will recognize that while the aspheric surfaces listed in Table 16 are all on concave surfaces, the aspheric surface could be a convex surface and in such embodiments the aspheric deformation terms cause the sag to be greater in absolute value than the absolute value of the sag determined by the base curve.

The ratio of the focal length ($EF_2$) of the negative power element in the triplet or triplet derivative in the fourth unit, to the minimum focal length ($EF_{min}$) of the zoom lens, for each of the seven embodiments described above, is given in the ensuing Table 17:

TABLE 17

| EMBODIMENT | $\left|\dfrac{EF_2}{EF_{min}}\right|$ |
|---|---|
| First | 0.98 |
| Second | 1.07 |
| Third | 1.12 |
| Fourth | 0.88 |
| Fifth | 1.03 |
| Sixth | 0.84 |
| Seventh | 0.93 |

It will be observed that for the embodiments of the invention described above $$0.8 < \left|\frac{EF_2}{EF_{min}}\right| < 1.2$$

It is to be understood that the term "triplet", as used herein, is used in its more common sense of a lens unit containing three elements with the middle element negative and with a positive element on each side of the negative element. The term "triplet", as used herein, does not include a negative, positive and negative arrangement of the three elements.

The invention has been described in detail with particular reference to a presently preferred embodiment, but it will be understood that variations and modifications can be effected within the spirit and scope of the invention.

What is claimed is:

1. A zoom lens comprising:
   at least ten elements arranged in four units including from front to rear:
   a positive unit facing the long conjugate and movable for focussing:
   a negative movable unit for zooming:
   a second positive unit movable for zooming; and
   a rear positive unit which is stationary;
      said positive unit facing the long conjugate consisting of a cemented doublet and a single element therebehind;
      said negative unit consisting of a negative element and a negative doublet concave toward each other;
      said second positive unit consisting of a single component including at least one positive element; and
      said rear unit is a "triplet" or "triplet" derivative wherein any element additional to three is a positive element.

2. A zoom lens as claimed in claim 1, having the following characteristics:

| SURFACE | CLEAR APERTURE | RADIUS | THICKNESS | REFRACTIVE INDEX | Abbe V NUMBER |
|---|---|---|---|---|---|
| S1 | 38.90 | 60.9222 | 1.400 | 1.805 | 25.4 |
| S2 | 36.52 | 28.4710 | 9.831 | 1.516 | 64.1 |
| S3 | 35.88 | −160.333 | 0.100 | | |
| S4 | 32.39 | 29.2124 | 6.186 | 1.691 | 54.8 |
| S5 | 30.80 | 217.953 | VAS 1 | | |
| S6 | 13.14 | −83.2997 | 0.900 | 1.834 | 37.3 |
| S7 | 11.20 | 11.3437 | 2.697 | | |
| S8 | 11.16 | −20.9476 | 0.900 | 1.691 | 54.8 |
| S9 | 11.93 | 10.1285 | 3.032 | 1.847 | 23.8 |
| S10 | 12.10 | 84.2060 | VAS 2 | | |
| S11 | 18.35 | 44.8396 | 6.309 | 1.657 | 36.7 |
| S12 | 18.47 | −13.6530 | 0.900 | 1.847 | 23.8 |
| S13 | 19.20 | −32.5751 | VAS 3 | | |
| | 19.32 | DIAPHRAGM | 2.800 | | |
| S14 | 19.56 | 14.9052 | 6.300 | 1.697 | 55.5 |
| S15 | 18.16 | −151.528 | 5.099 | | |
| S16 | 13.80 | ASPHERE | 0.950 | 1.785 | 26.1 |
| S17 | 13.68 | 13.4237 | 1.880 | | |
| S18 | 14.10 | 77.5372 | 3.000 | 1.691 | 54.8 |
| S19 | 14.85 | −20.4114 | 0.110 | | |
| S20 | 16.36 | 19.0474 | 4.500 | 1.603 | 60.7 |
| S21 | 16.22 | −26.2507 | 5.000 | | |
| S22 | 12.43 | PLANO | 7.500 | 1.516 | 64.1 |
| S23 | 9.53 | PLANO | | | | and the values of the variable air spaces VAS1, VAS2, and VAS3 for each of the three effective focal lengths specified are:

| EFFECTIVE FOCAL LENGTH | LENGTH OF | | |
|---|---|---|---|
| | VAS 1 | VAS 2 | VAS 3 |
| 9.22 | 1.495 | 17.936 | 9.074 |
| 22.22 | 13.961 | 13.544 | 1.000 |
| 53.49 | 19.278 | 2.495 | 6.732 | and the aspheric surface is in accordance with the equation:

$$X = \frac{CY^2}{1 + \sqrt{1 - (K+1)C^2Y^2}} + DY^4 + EY^6 + FY^8$$

with the values of the terms C, D, E, F and K for surface S16 being:

| |
|---|
| C = −0.0646569 |
| D = −0.1617108⁻³ |
| F = −0.6633698⁻⁸ |
| K = −4.9775560 |
| E = 0.1783292⁻⁵ |
| and the VERTEX RADIUS = −15.4663 |

3. A zoom lens as claimed in claim 1, having the following characteristics:

| SURFACE | CLEAR APERTURE | RADIUS | THICKNESS | REFRACTIVE INDEX | Abbe V NUMBER |
|---|---|---|---|---|---|
| S1 | 34.00 | 67.2816 | 0.900 | 1.805 | 25.4 |
| S2 | 32.56 | 28.2623 | 8.060 | 1.516 | 64.1 |
| S3 | 32.23 | −113.295 | 0.100 | | |
| S4 | 30.04 | 26.7943 | 5.162 | 1.691 | 54.8 |
| S5 | 29.27 | 159.848 | VAS 1 | | |
| S6 | 12.60 | −102.467 | 0.900 | 1.834 | 37.3 |
| S7 | 10.80 | 10.8209 | 3.011 | | |
| S8 | 10.93 | −18.4410 | 0.900 | 1.691 | 54.8 |
| S9 | 12.22 | 10.5695 | 3.332 | 1.847 | 23.8 |
| S10 | 12.49 | 148.756 | VAS 2 | | |
| S11 | 19.46 | 53.0900 | 6.326 | 1.657 | 36.7 |
| S12 | 19.64 | −14.4842 | 0.900 | 1.847 | 23.8 |
| S13 | 20.52 | −33.9193 | VAS 3 | | |
| | 20.74 | DIAPHRAGM | 2.800 | | |
| S14 | 21.29 | 16.4761 | 6.300 | 1.697 | 55.5 |
| S15 | 19.96 | −276.268 | 6.680 | | |
| S16 | 14.26 | ASPHERE | 0.950 | 1.785 | 26.1 |
| S17 | 14.53 | 15.5955 | 1.350 | | |
| S18 | 15.18 | 31.5979 | 4.500 | 1.691 | 54.8 |
| S19 | 15.98 | −19.2937 | 0.300 | | |
| S20 | 16.42 | 20.6948 | 3.800 | 1.603 | 60.7 |
| S21 | 16.03 | −63.4256 | 5.000 | | |
| S22 | 12.83 | PLANO | 7.500 | 1.516 | 64.1 |
| S23 | 10.03 | PLANO | | | | and the values of the variable air spaces VAS 1, VAS 2 and VAS 3 for each of the three effective focal lengths specified are:

| EFFECTIVE FOCAL LENGTH | LENGTH OF | | |
|---|---|---|---|
| | VAS 1 | VAS 3 | VAS 3 |
| 9.22 | 1.495 | 17.936 | 9.074 |
| 22.22 | 13.961 | 13.544 | 1.000 |
| 53.49 | 19.278 | 2.495 | 1.732 | and the aspheric surface is in accordance with the equation:

$$X = \frac{CY^2}{1 + \sqrt{1 - (K+1)C^2Y^2}} + DY^4 + EY^6 + FY^8$$

with the values of the terms C, D, E, F and K for the surface S6 being:

| |
|---|
| C = −0.0636829 |
| D = −0.1533871⁻³ |
| F = −0.3029987⁻⁸ |
| K = −4.077556 |
| E = 0.1291248⁻⁵ |
| and the VERTEX RADIUS = −15.7028 |

4. A zoom lens as claimed in claim 1, having the following characteristics:

| SURFACE | CLEAR APERTURE | RADIUS | THICKNESS | REFRACTIVE INDEX | Abbe V NUMBER |
|---|---|---|---|---|---|
| S1 | 34.40 | 88.1710 | 0.900 | 1.805 | 25.4 |
| S2 | 33.13 | 31.0710 | 8.103 | 1.516 | 64.1 |
| S3 | 32.89 | −81.8223 | 0.100 | | |
| S4 | 30.30 | 26.7278 | 4.921 | 1.691 | 54.8 |
| S5 | 29.57 | 123.327 | VAS 1 | | |
| S6 | 13.74 | −432.666 | 0.900 | 1.720 | 50.3 |
| S7 | 11.50 | 11.0422 | 3.529 | | |
| S8 | 11.49 | −15.8709 | 0.900 | 1.691 | 54.8 |
| S9 | 12.63 | 12.0957 | 2.792 | 1.847 | 23.8 |
| S10 | 12.83 | 96.1403 | VAS 2 | | |
| S11 | 19.34 | ASPHERE | 3.000 | 1.589 | 61.0 |

-continued

| SURFACE | CLEAR APERTURE | RADIUS | THICKNESS | REFRACTIVE INDEX | Abbe V NUMBER |
|---|---|---|---|---|---|
| S12 | 19.53 | −53.7465 | VAS 3 | | |
| | 19.64 | DIAPHRAGM | 2.800 | | |
| S13 | 20.43 | 15.9201 | 8.000 | 1.697 | 55.5 |
| S14 | 18.34 | −63.4890 | 2.950 | | |
| S15 | 15.69 | ASPHERE | 1.500 | 1.785 | 26.1 |
| S16 | 15.00 | 15.9256 | 1.916 | | |
| S17 | 15.62 | 56.9972 | 4.500 | 1.691 | 54.8 |
| S18 | 16.57 | −19.5166 | 1.000 | | |
| S19 | 17.10 | 24.5863 | 5.600 | 1.607 | 56.8 |
| S20 | 16.42 | −49.7539 | 5.000 | | |
| S21 | 13.24 | PLANO | 7.500 | 1.516 | 64.1 |
| S22 | 10.53 | PLANO | | | | and the values of the variable air spaces VAS 1 VAS 2 and VAS 3 for each of the three effective focal lengths specified are:

| EFFECTIVE FOCAL LENGTH | VAS 1 | VAS 2 | VAS 3 |
|---|---|---|---|
| 9.22 | 1.495 | 18.187 | 9.457 |
| 22.21 | 13.848 | 14.291 | 1.000 |
| 53.50 | 19.476 | 2.495 | 7.169 | and the aspheric surfaces S11 and S15 are in accordance with the equation:

$$X = \frac{CY^2}{1 + \sqrt{1 - (K+1)C^2Y^2}} + DY^4 + EY^6 + FY^8$$

with the values of the terms, C, D, E, F and K being: for surface S11:

| | |
|---|---|
| C = | 0.0187374 |
| D = | 0.0 |
| F = | 0.0 |
| K = | −9.3755340 |
| E = | 0.0 |
| and the VERTEX RADIUS = | 53.3691 | for surface s15:

| | |
|---|---|
| C = | −0.0579609 |
| D = | −0.1066331$^{-3}$ |
| F = | −0.2321880$^{-8}$ |
| K = | −4.0775560 |

-continued

| | |
|---|---|
| E = | 0.9030583$^{-6}$ |
| and the VERTEX RADIUS = | −17.253. |

5. A zoom lens as claimed in claim 1, having the following characteristics:

| SURFACE | CLEAR APERTURE | RADIUS | THICKNESS | REFRACTIVE INDEX | Abbe V NUMBER |
|---|---|---|---|---|---|
| S1 | 32.59 | 83.1671 | 0.900 | 1.805 | 25.4 |
| S2 | 31.18 | 29.1023 | 8.043 | 1.516 | 64.1 |
| S3 | 30.80 | −69.6248 | 0.100 | | |
| S4 | 27.50 | 23.3625 | 4.693 | 1.691 | 54.8 |
| S5 | 26.58 | 81.4355 | VAS 1 | | |
| S6 | 12.00 | 377.836 | 0.900 | 1.720 | 50.3 |
| S7 | 9.96 | 9.60466 | 3.011 | | |
| S8 | 9.75 | −12.8277 | 0.900 | 1.691 | 54.8 |
| S9 | 10.40 | 11.0925 | 2.411 | 1.847 | 23.8 |
| S10 | 10.60 | 68.6848 | VAS 2 | | |
| S11 | 15.70 | ASPHERE | 3.000 | 1.516 | 64.1 |
| S12 | 15.90 | −33.9288 | VAS 3 | | |
| | 16.03 | DIAPHRAGM | 9.517 | | |
| S13 | 16.64 | 19.3913 | 9.558 | 1.806 | 40.9 |
| S14 | 14.87 | −21.8160 | 0.635 | | |
| S15 | 14.80 | ASPHERE | 0.900 | 1.847 | 23.8 |
| S16 | 14.62 | 13.7192 | 1.227 | | |
| S17 | 15.94 | 20.2903 | 5.548 | 1.806 | 40.9 |
| S18 | 16.40 | −17.6929 | 5.000 | | |
| S19 | 13.30 | PLANO | 7.500 | 1.516 | 64.1 |
| S20 | 11.15 | PLANO | | | | and the values of the variable air spaces VAS 1, VAS 2 and VAS 3 for each of the three effective focal lengths specified are:

| EFFECTIVE FOCAL LENGTH | VAS 1 | VAS 2 | VAS 3 |
|---|---|---|---|
| 9.22 | 1.495 | 14.509 | 9.920 |
| 22.21 | 13.133 | 11.179 | 1.612 |
| 53.49 | 18.214 | 2.495 | 5.215 | and the aspheric surfaces S11 and S15 are in accordance with the equation:

$$X = \frac{CY^2}{1 + \sqrt{1 - (K+1)C^2Y^2}} + DY^4 + EY^6 + FY^8 + GY^{10}$$

with the values of the terms C, D, E, F, G and K in the aspheric equation for the two aspheric surfaces S11 and S15 being as follows:

| | |
|---|---|
| C = | .0324035 |

-continued

```
            D =    0.0
            F =   -5.84099
            E =    0.0
            G =    0
        and the VERTEX RADIUS = 30.8609
for surface S15
            C =   -0.0666265
            D =   -0.5318318$^{-4}$
            F =   -0.2140706$^{-8}$
            K =   -0.7570620
            E =    0.7207075$^{-6}$
            G =    0.3281086$^{-10}$
        and the VERTEX RADIUS = -15.0090.
```

6. A zoom lens as claimed in claim 1, having the following characteristics:

| SURFACE | CLEAR APERTURE | RADIUS | THICKNESS | REFRACTIVE INDEX | Abbe V NUMBER |
|---|---|---|---|---|---|
| S1 | 32.41 | 54.3724 | 0.900 | 1.805 | 25.4 |
| S2 | 30.84 | 26.7134 | 6.909 | 1.516 | 64.1 |
| S3 | 30.33 | -339.941 | 0.100 | | |
| S4 | 28.00 | 26.3356 | 4.855 | 1.691 | 54.8 |
| S5 | 27.09 | 137.475 | VAS 1 | | |
| S6 | 13.23 | -247.601 | 0.900 | 1.492 | 57.4 |
| S7 | 10.20 | ASPHERE | 3.519 | | |
| S8 | 10.09 | -11.8136 | 0.900 | 1.516 | 64.1 |
| S9 | 10.87 | 8.37217 | 2.989 | 1.590 | 30.9 |
| S10 | 11.08 | 70.8975 | VAS 2 | | |
| S11 | 16.00 | 63.1187 | 3.000 | 1.492 | 57.4 |
| S12 | 16.22 | -28.8454 | VAS 3 | | |
| | 16.37 | DIAPHRAGM | 3.431 | | |
| S13 | 16.89 | 13.4946 | 9.964 | 1.516 | 64.1 |
| S14 | 14.27 | -19.2823 | 1.000 | | |
| S15 | 13.60 | ASPHERE | 3.172 | 1.590 | 30.9 |
| S16 | 13.44 | 10.9714 | 1.112 | | |
| S17 | 14.70 | 14.3087 | 6.007 | 1.492 | 57.4 |
| S18 | 15.33 | -20.0016 | 0.500 | | |
| S19 | 15.27 | 21.5406 | 4.500 | 1.492 | 57.4 |
| S20 | 14.55 | -81.7220 | 5.000 | | |
| S21 | 11.95 | PLANO | 7.500 | 1.516 | 64.1 |
| S22 | 9.58 | PLANO | | | | and the values of the variable air spaces VAS 1, VAS 2 and VAS 3, for each of the three effective focal lengths specified are:

| EFFECTIVE FOCAL LENGTH | LENGTH OF | | |
|---|---|---|---|
| | VAS 1 | VAS 2 | VAS 3 |
| 9.22 | 1.495 | 15.932 | 10.069 |
| 22.20 | 13.816 | 12.465 | 1.215 |
| 53.48 | 19.413 | 2.495 | 5.588 | and the aspheric surfaces S7 and S15 are in accordance with the equation $$X = \frac{CY^2}{1 + \sqrt{1 - (K+1)C^2Y^2}} + DY^4 + EY^6 + FY^8 + GY^{10}$$

with the values of the terms C, D, E, F, G, and K in the aspheric equation being:

```
for surface S7
            C =    0.1371033
            D =   -0.8069293$^{-4}$
            F =    0.0
            K =   -0.0095560
            E =   -0.1065725$^{-5}$
            G =    0.0
        and the VERTEX RADIUS = 7.2938
for surface S5
            C =   -0.0790012
            D =   -0.1171127$^{-3}$
            F =   -0.1260090
            K =   -1.5492770
            E =    0.1413820$^{-5}$
            G =    0.9930528$^{-10}$
        and the VERTEX RADIUS = -12.6580.
```

7. A zoom lens as claimed in claim 1, having the following characteristics:

| SURFACE | CLEAR APERTURE | RADIUS | THICKNESS | REFRACTIVE INDEX | Abbe V NUMBER |
|---|---|---|---|---|---|
| S1 | 32.99 | 75.4264 | 0.900 | 1.805 | 25.4 |
| S2 | 31.58 | 30.0901 | 7.220 | 1.516 | 64.1 |
| S3 | 31.15 | -118.456 | 0.100 | | |
| S4 | 28.28 | 25.8903 | 4.857 | 1.691 | 54.8 |
| S5 | 27.20 | 121.226 | VAS 1 | | |
| S6 | 12.60 | 104.007 | 0.900 | 1.720 | 50.3 |
| S7 | 10.54 | 10.3313 | 2.982 | | |
| S8 | 10.10 | ASPHERE | 0.600 | 1.728 | 50.6 |
| S9 | 10.52 | 13.6679 | 2.377 | 1.847 | 23.8 |
| S10 | 10.75 | -947.418 | VAS 2 | | |
| S11 | 15.00 | 72.7809 | 3.000 | 1.697 | 55.5 |
| S12 | 15.32 | -43.6968 | VAS 3 | | |
| | 15.41 | DIAPHRAGM | 8.426 | | |
| S13 | 15.82 | 13.9159 | 8.800 | 1.806 | 40.9 |
| S14 | 13.13 | -30.8763 | 0.509 | | |
| S15 | 13.00 | ASPHERE | 1.000 | 1.844 | 23.8 |

-continued

| SURFACE | CLEAR APERTURE | RADIUS | THICKNESS | REFRACTIVE INDEX | Abbe V NUMBER |
|---|---|---|---|---|---|
| S16 | 11.94 | 10.1636 | 2.484 | | |
| S17 | 14.30 | 19.0335 | 6.100 | 1.804 | 46.5 |
| S18 | 14.80 | −19.0335 | 5.000 | | |
| S19 | 12.05 | PLANO | 7.500 | 1.516 | 64.1 |
| S20 | 9.98 | PLANO | | | | and the values of the variable air spaces VAS 401, VAS 402 and VAS 403 for each of the three effective focal lengths specified are:

| EFFECTIVE FOCAL LENGTH | BACK FOCAL LENGTH | LENS LENGTH | LENGTH OF | | |
|---|---|---|---|---|---|
| | | | VAS 401 | VAS 402 | VAS 403 |
| 9.24 | 14.34 | 79.211 | 1.300 | 18.148 | 9.508 |
| 22.20 | 14.29 | 79.211 | 13.813 | 13.373 | 1.771 |
| 52.49 | 14.30 | 79.211 | 19.191 | 1.050 | 8.715 | and the aspheric surfaces S8 and S15 are in accordance with the equation $$X = \frac{CY^2}{1 + \sqrt{1 - (K + 1)C^2 Y^2}} + DY^4 + EY^6 + FY^8 + GY^{10}$$

with the values of the terms C, D, E, F, G, and K in the aspheric equation being:

for surface S8
$C = -0.07114602$
$D = -0.4431^{-4}$
$E = -0.1143^{-5}$
$F = 0.1390^{-7}$
$G = 0$
$K = -1.3254$
and the VERTEX RADIUS = −14.0556 for surface S15
$C = -0.05164596$
$D = -0.5555^{-4}$
$E = 0.1490^{-5}$
$F = 0.8421^{-8}$
$G = 0.5381^{-10}$
$K = -0.0667$
and the VERTEX RADIUS = −19.3626.

8. A zoom lens as claimed in claim 1, having the following characteristics:

| SURFACE | CLEAR APERTURE | RADIUS | THICKNESS | REFRACTIVE INDEX | Abbe V NUMBER |
|---|---|---|---|---|---|
| S1 | 32.99 | 60.4258 | 0.900 | 1.805 | 25.4 |
| S2 | 31.66 | 30.8765 | 6.423 | 1.516 | 64.1 |
| S3 | 31.21 | −184.883 | 0.100 | | |
| S4 | 28.35 | 26.7528 | 4.511 | 1.603 | 60.7 |
| S5 | 27.36 | 124.898 | VAS 1 | | |
| S6 | 12.40 | 59.3635 | 0.900 | 1.720 | 50.3 |
| S7 | 10.43 | 10.2374 | 2.876 | | |
| S8 | 10.09 | ASPHERE | 0.600 | 1.728 | 50.6 |
| S9 | 10.37 | 14.7870 | 2.203 | 1.847 | 23.8 |
| S10 | 10.44 | PLANO | VAS 2 | | |
| S11 | 14.60 | 100.761 | 3.000 | 1.697 | 55.5 |
| S12 | 15.00 | −40.5144 | VAS 3 | | |
| | 15.24 | DIAPHRAGM | 8.404 | | |
| S13 | 16.22 | 14.8190 | 8.800 | 1.806 | 40.9 |
| S14 | 13.86 | −30.3985 | 0.508 | | |
| S15 | 13.69 | ASPHERE | 1.000 | 1.844 | 23.8 |
| S16 | 12.70 | 11.2181 | 2.162 | | |
| S17 | 14.70 | 19.3072 | 6.500 | 1.786 | 43.9 |
| S18 | 15.24 | −19.3072 | 5.000 | | |
| S19 | 12.48 | PLANO | 7.500 | 1.516 | 64.1 |
| S20 | 10.42 | PLANO | | | | and the values of the variable air spaces VAS 401, VAS 402 and VAS 403 for each of the three effective focal lengths specified are:

| EFFECTIVE FOCAL LENGTH | BACK FOCAL LENGTH | LENS LENGTH | LENGTH OF | | |
|---|---|---|---|---|---|
| | | | VAS 401 | VAS 402 | VAS 403 |
| 9.23 | 15.40 | 78.040 | 1.300 | 15.863 | 11.990 |
| 22.21 | 15.37 | 78.040 | 15.105 | 12.110 | 1.938 |
| 52.49 | 15.37 | 78.040 | 21.397 | 1.050 | 6.706 | and the aspheric surfaces S8 and S15 are in accordance with the equation $$X = \frac{CY^2}{1 + \sqrt{1 - (K + 1)C^2 Y^2}} + DY^4 + EY^6 + FY^8 + GY^{10}$$

with the values of the terms C, D, E, F, G, and K in the aspheric equation being:

for surface S8
$C = -0.07395629$
$D = -0.36075^{-4}$
$E = -0.85039^{-6}$
$F = 0.856744^{-7}$
$G = 0$
$K = -0.9493$
and the VERTEX RADIUS = −13.5215 for surface S15
$C = -0.04710493$
$D = -0.60469^{-4}$
$E = 0.12213^{-5}$
$F = -0.75038^{-8}$
$G = 0.53814^{-10}$
$K = -0.06695$ -continued and the VERTEX RADIUS = −21.2292.

9. A zoom lens comprising:
at least ten elements arranged in no more than four units including from front-to-rear:
a positive unit facing the long conjugate and movable for focussing;
a negative movable unit for zooming;
a second positive unit movable for zooming; and
a fourth, rear unit which is stationary;
said positive unit facing the long conjugate consisting of a cemented double and a single element therebehind;
said negative unit consisting of a negative element and a negative doublet concave toward each other;
said second positive unit consisting of a single component including at least one positive element; and
said rear unit is a "triplet" or "triplet derivative" wherein any element additional to three is a positive element.

10. A zoom lens comprising:
at least ten elements at least one of which has an aspheric surface, said elements arranged in no more than four units including from front to rear:
a positive unit facing the long conjugate and movable for focussing;
a negative movable unit for zooming;
a second positive unit movable for zooming; and
a rear unit which is stationary;
said positive unit facing the long conjugate consisting of a cemented doublet and a single element therebehind;
said negative unit consisting of a negative element and a negative doublet concave toward each other;
said second positive unit consisting of a single component including at least one positive element; and
said rear unit is a "triplet" or "triplet derivative" wherein any element additional to three is a positive element.

11. A zoom lens as claimed in claims 1, 9 or 10, wherein an element in said rear unit has an aspheric surface.

12. A zoom lens as claimed in claim 11, wherein the aspheric surface is a concave surface, the sag of which is less in absolute value than the absolute value of the sag determined by the base curve.

13. A zoom lens as claimed in claim 11, wherein the aspheric surface is a convex surface and the sag of said aspheric surface is greater in absolute value than the absolute value of the said determined by the base curve.

14. A zoom lens as claimed in claims 1, 9 or 10, wherein the focal length (E F$_2$) of the negative power element in the triplet is $$0.8 < \frac{|E F_2|}{|E F_{min}|} < 1.2, \text{ wherein}$$

15. A zoom lens as claimed in claim 11, wherein the focal length (E F$_2$) of the negative power element in the triplet is $$0.8 < \frac{|E F_2|}{|E F_{min}|} < 1.2, \text{ wherein}$$

E F$_{min}$ is the minimum focal length of the zoom lens.

16. A zoom lens as claimed in claim 12, wherein the focal length (E F$_2$) of the negative power element in the triplet is $$0.8 < \frac{|E F_2|}{|E F_{min}|} < 1.2, \text{ wherein}$$

E F$_{min}$ is the minimum focal length of the zoom lens.

17. A zoom lens as claimed in claim 13, wherein the focal length (E F$_2$) of the negative power element in the triplet is $$0.8 < \frac{|E F_2|}{|E F_{min}|} < 1.2, \text{ wherein}$$

E F$_{min}$ is the minimum focal length of the zoom lens.

18. A zoom lens as claimed in claim 1, 9 or 16, wherein the distance from the front vertex to the image plane is less than twice the maximum focal length of the lens.

19. A zoom lens as claimed in claim 11, wherein the distance from the front vertex to the image plane is less than twice the maximum focal length of the lens.

20. A zoom lens as claimed in claim 12, wherein the distance from the front vertex to the image plane is less than twice the maximum focal length of the lens.

21. A zoom lens as claimed in claim 13, wherein the distance from the front vertex to the image plane is less than twice the maximum focal length of the lens.

22. A zoom lens as claimed in claims 1, 9 or 10, wherein the clear aperture of the front element of the lens is less than 80% of the maximum focal length of the lens and the relative illumination is 40%, or greater, at both the maximum and the minimum focal length.

23. A zoom lens as claimed in claim 11, wherein the clear aperture of the front element of the lens is less than 80% of the maximum focal length of the lens and the relative illumination is 40%, or greater, at both the maximum and the minimum focal length.

24. A zoom lens according to claim 12, wherein the clear aperture of the front element of the lens is less than 80% of the maximum focal length of the lens and the relative illumination is 40%, or greater, at both the maximum and the minimum focal length.

25. A zoom lens according to claim 10, wherein the clear aperture of the front element of the lens is less than 80% of the maximum focal length of the lens and the relative illumination is 40%, or greater, at both the maximum and the minimum focal length.

* * * * *

UNITED STATES PATENT OFFICE
CERTIFICATE OF CORRECTION

Patent No. 4,934,795                    Dated June 19, 1990

Inventor(s)  Lee R. Estelle

It is certified that error appears in the above-identified patent and that said Letters Patent is hereby corrected as shown below:

| | READS | SHOULD READ |
|---|---|---|
| Col. 9, ln 61 | "$-0.1065725^{-5}=$" | --"$E=-0.1065725^{-5}$"-- |
| Col. 15, ln. 23, | "$K=-4,9775560$" | --"$K=-4.0775560$"-- |
| Col. 19, ln. 3, | "$F=-5.84099$" | --"$F=0.0$"-- |
| Col. 19, ln. 4, | insert after "$F=0.0$" because of omission in patent as ln. 4 | --"$\underline{K=-5.84099}$"-- |
| Col. 23, ln. 15, | "double" | --"doublet"-- |
| Col. 23, ln. 60, | "of the said" | --"of the $\underline{sag}$"-- |
| Col. 24, ln. 30, | "claim 1, 9, or 16" | --"claim 1, 9, or 10"-- |
| Col. 24, ln. 48, | "w herein" | --"wherein"-- |

Signed and Sealed this

Twenty-fifth Day of June, 1991

Attest:

*Attesting Officer*

HARRY F. MANBECK, JR.

*Commissioner of Patents and Trademarks*